US006982065B2

(12) United States Patent
Carroni et al.

(10) Patent No.: US 6,982,065 B2
(45) Date of Patent: Jan. 3, 2006

(54) CATALYZER

(75) Inventors: Richard Carroni, Niederrohrdorf (CH); Timothy A. Griffin, Ennetbaden (CH); Verena Schmidt, Baden (CH); Dieter Winkler, Lauchringen (DE)

(73) Assignee: Alstom Technology Ltd, Baden (CH)

( * ) Notice: Subject to any disclaimer, the term of this patent is extended or adjusted under 35 U.S.C. 154(b) by 685 days.

(21) Appl. No.: 10/022,742

(22) Filed: Dec. 20, 2001

(65) Prior Publication Data

US 2003/0031608 A1 Feb. 13, 2003

(30) Foreign Application Priority Data

Aug. 8, 2001 (CH) .............................. 2001 1468/01

(51) Int. Cl.
*B01D 50/00* (2006.01)
*B01J 21/04* (2006.01)
*F23D 3/40* (2006.01)

(52) U.S. Cl. ...................... 422/177; 422/190; 502/527; 502/527.22; 431/7

(58) Field of Classification Search ................ 422/180, 422/174, 177, 175; 428/593, 603; 502/527.22; 431/7; 429/41, 40
See application file for complete search history.

(56) References Cited

U.S. PATENT DOCUMENTS

| 4,870,824 | A | | 10/1989 | Young et al. |
| 5,232,357 | A | * | 8/1993 | Dalla Betta et al. ............ 431/7 |
| 5,328,359 | A | | 7/1994 | Retallick |
| 5,346,389 | A | | 9/1994 | Retallick et al. |
| 5,366,700 | A | * | 11/1994 | Humpolik et al. .......... 422/180 |
| 5,441,806 | A | * | 8/1995 | Brandt et al. ................ 428/349 |
| 5,512,250 | A | | 4/1996 | Betta et al. |
| 5,518,697 | A | | 5/1996 | Dalla Betta et al. |
| 5,998,056 | A | * | 12/1999 | Divisek et al. ................ 429/41 |
| 6,436,551 | B1 | * | 8/2002 | Wieres ........................ 428/593 |

FOREIGN PATENT DOCUMENTS

| DE | 40 18 704 | 1/1992 |
| WO | 97/23276 | 7/1997 |
| WO | 99/55459 | 11/1999 |

OTHER PUBLICATIONS

Patent Abstracts of Japan, vol. 008, No. 255 (C-253), Nov. 21, 1994, JP 59 136140 A (Babcock Hitachi KK), Aug. 4, 1984.

* cited by examiner

*Primary Examiner*—Glenn Caldarola
*Assistant Examiner*—Tom P. Duong
(74) *Attorney, Agent, or Firm*—Buchanan Ingersoll PC

(57) ABSTRACT

A catalyzer has a plurality of plane sheets arranged superposed and spaced apart from each other in a stack, between which a plurality of straight channels extend parallel in the flow direction and are delimited by the plane sheets. The plane sheets are coated in such a way that a catalytic coating is present in all channels; that the catalytic coating is limited to predetermined sections of the channels; and that inside the channels, uncoated sections in each case are positioned opposite to sections with the catalytic coatings. The uncoated sections absorb the heat radiation emitted by the catalytic coatings during operation, thereby improving cooling and preventing homogeneous ignition.

30 Claims, 12 Drawing Sheets

CATALYZER

FIELD OF THE INVENTION

The present invention relates to the field of catalyzer technology. More particular, the present invention relates to a catalyzer with plane sheets, each two successive plane sheets forming a channel, and a catalytic coating deposited on predetermined sections of the channels opposite uncoated sections.

BACKGROUND OF THE INVENTION

A number of publications describe catalytic carrier structures in which the overheating of the catalytic coatings is reduced by limiting the maximum heterogeneous fuel conversion to approximately 50%. This is achieved by providing the channels arranged inside the catalyzer alternately with a catalytic coating, i.e. coated and non-coated channels are alternated (cf. U.S. Pat. No. 4,870,824 or U.S. Pat. No. 5,346,389 or U.S. Pat. No. 5,328,359). In the solutions described in U.S. Pat. No. 5,346,389 or U.S. Pat. No. 5,328,359, either an alternately coated, corrugated carrier sheet is folded in zigzag shape, or a structure of two superposed sheets is rolled up. U.S. Pat. No. 5,518,697 or U.S. Pat. No. 5,512,250 furthermore disclose a three-layer structure in which the coated and uncoated channels have different dimensions in order to further improve the cooling of the catalytic coatings.

In order to prevent a deactivation of the catalytic coatings, it is critical that their surface temperature is maintained below a predetermined value that depends on the type of the catalyzer material. For example, in the case of PdO, a reduction to Partial diffuser sets in at temperatures above approximately 900° C. (at pressures >15 bar). In the above-mentioned publications, the surface temperature is limited in that not all surfaces are provided with a catalytic coating. In U.S. Pat. No. 5,328,359, the surface temperature remains high under the operating conditions of a gas turbine: $T_{surface}=T_{in}+\frac{1}{2}T_{ad}$ typically reaches 1,000° C., whereby $T_{surface}$ is the surface temperature, $T_{in}$ is the temperature at the inlet of the catalyzer, and $T_{ad}$ is the adiabatic combustion temperature. In U.S. Pat. No. 5,518,697, additional convective cooling is achieved by enlarging the cross-section surfaces of the non-coated channels in relation to the coated channels. In both cases, however, channels exist that are not provided with any sort of catalytic coating. Under the conditions present with a gas turbine (mixtures with $\lambda=2.2$ at pressures >15 bar), there exists, however, the concrete risk of homogeneous ignition near the surfaces, particularly in the uncoated channels, since no reduction of the fuel concentration occurs there. This problem is increased in that the uncoated channels at the same time are those channels with the greatest hydraulic diameter.

SUMMARY OF THE INVENTION

It is therefore the objective of the invention to create a catalyzer or catalytically coated carrier structure that simultaneously enables improved cooling of the catalytic surface and safely avoids the homogeneous ignition in the catalyzer.

The objective can be solved by a catalyzer with a plurality of plane sheets arranged superposed and spaced apart from each other in a stack. Each two successive plane sheets define a straight channel that extends parallel to a flow direction and is delimited by the plane sheets. A catalytic coating on a predetermined section of each channel defines a coated section and is positioned opposite to an uncoated section of the channel. At least a portion of a heat radiation emitted from the catalytic coating is absorbed by the uncoated section. The plane sheets are coated in such a way that catalytic coatings are present in all channels; that the catalytic coatings are limited to predetermined sections of the channels; and that inside the channels, uncoated sections in each case are positioned opposite to sections with the catalytic coatings in order to absorb the heat radiation emitted by the catalytic coatings during operation. The channels are formed by corrugated sheets, each of which is arranged between the plane sheets and is connected to them.

The solution utilizes the fact that the hot surfaces of the catalytic coatings emit a certain part of heat in the form of radiation. This radiation energy can be absorbed by adjoining catalytically non-active surfaces and removed by convective cooling. At the temperatures of interest for the gas turbine operation, the heat emitted by radiation, for example, may amount to approximately 30% of the convectively emitted heat. This means that if the catalytically inactive, heat-absorbing surfaces are optimized, the cooling can be clearly improved. Through the alternation of coated and uncoated areas, the conditions in all channels, while utilizing the heat emission by radiation, are simultaneously homogenized, eliminating the risk of a homogeneous ignition. In order to increase the throughput, the coating surface is enlarged in that sections of the corrugated sheets are also catalytically coated in the same manner as the plane sheets.

BRIEF DESCRIPTION OF THE DRAWINGS

Preferred embodiments of the invention are disclosed in the following description and illustrated in the accompanying drawings, in which.

DETAILED DESCRIPTION OF THE INVENTION

The present invention is directed to a catalyzer. The term catalyzer in the present case means a carrier structure provided with a catalytic coating. The carrier structure according to the invention can be used for many exothermic catalytic reactions, for example for catalytic combustion and synthetic gas generation, especially in cases where a concomitant gas phase reaction must be prevented.

Figure 1:
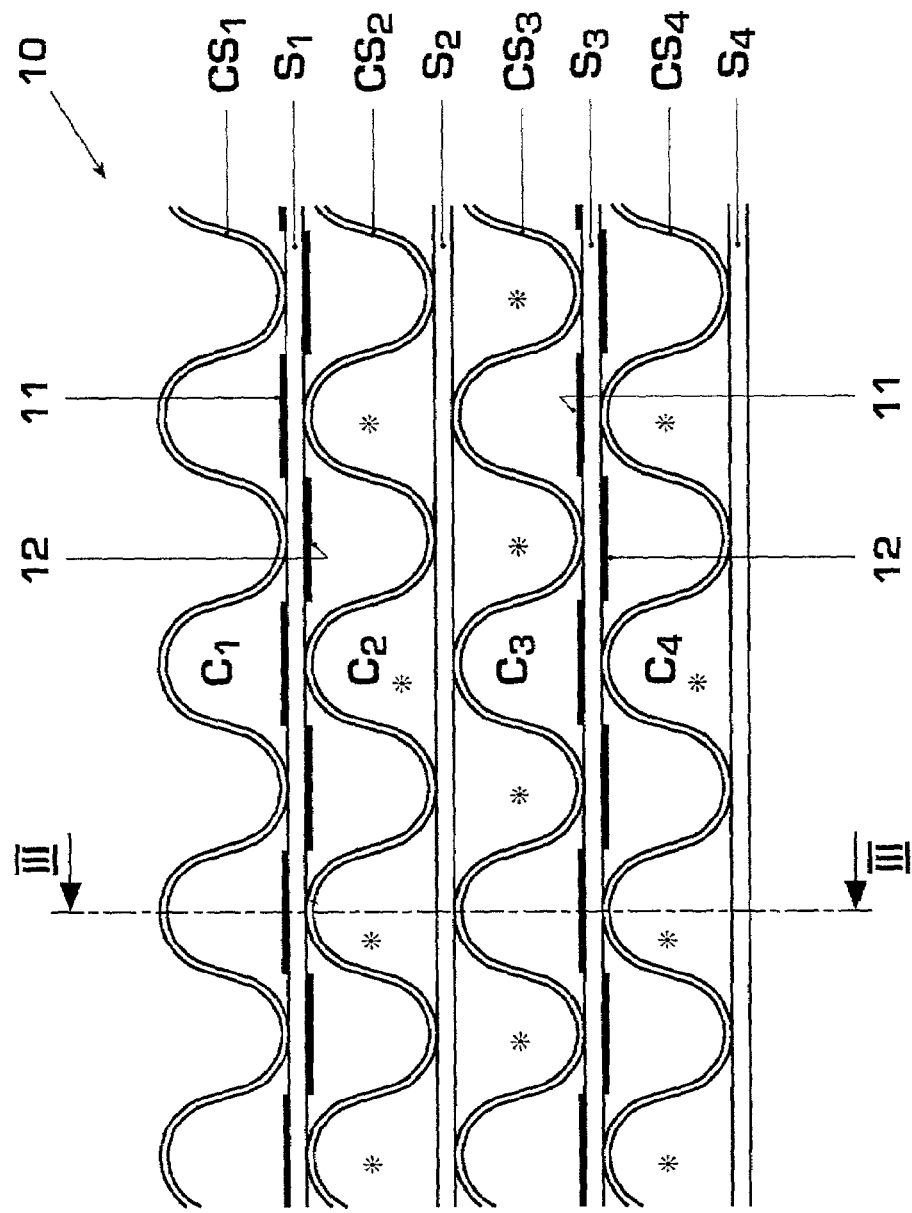
FIG. 1 shows a schematic view in the flow direction onto the inlet side of a catalyzer according to a first preferred exemplary embodiment of the invention.

FIG. 1 shows a schematic view in the flow direction onto the inlet side of the catalyzer according to a first preferred exemplary embodiment of the invention. The catalyzer 10, shown partially, comprises a stack of plane sheets S1, . . . ,S4 and corrugated sheets CS1, . . . ,CS4, arranged alternately in the stack and connected with each other. The stack of sheets S1, . . . ,S4 and CS1, . . . ,CS4 forms the structure of the catalyzer 10. The corrugated sheets CS1, . . . ,CS4 create a plurality of separate, parallel channels between adjoining, plane sheets, of which four selected and superposed sheets in FIG. 1 are designated with the reference numbers C1, . . . ,C4.

Figure 2:
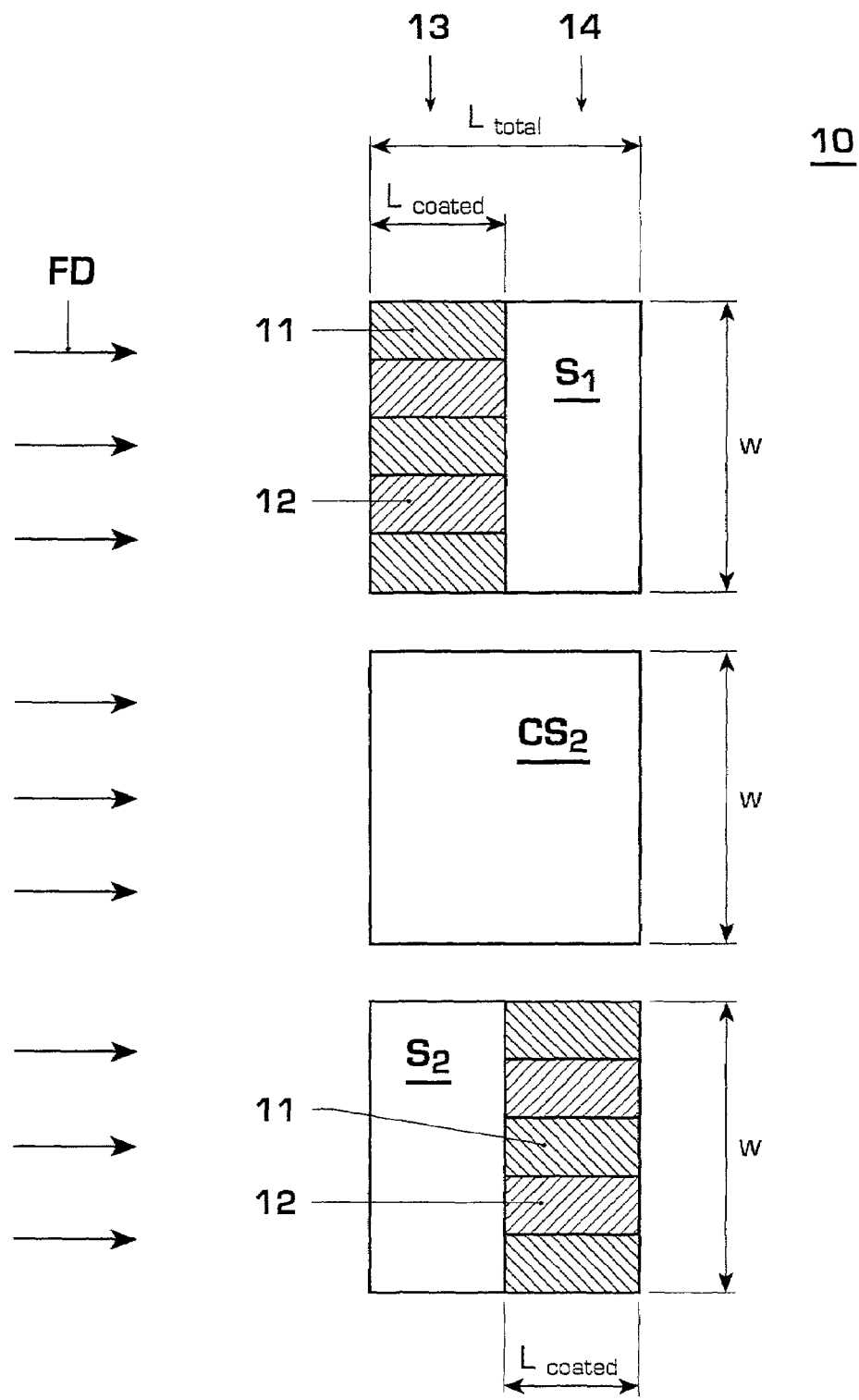
FIG. 2 shows the view from the top onto different coated and uncoated sheets of the catalyzer according to FIG. 1.

The corrugated sheets CS1, . . . ,CS4 are very thin and typically have a thickness of 0.05 mm. The plane sheets S1, . . . ,S4 are, for reasons of good solid-state heat conduction, significantly thicker than the former. The plane sheets S1, S3 and S2, S4 are, taken by themselves, practically identical (as seen in FIG. 2), but are integrated into the stack in a different arrangement. The entire catalyzer 10 is constructed of a specific number of superposed units, whereby each unit comprises a sequence of sheets S1, CS2, S2, CS3, and thus has a height of two channel diameters.

The catalytic coating 11, 12 necessary for the catalyzer function is arranged in the form of bands extending in flow direction FD (FIG. 2) on the plane sheets S1, . . . ,S4 in a certain configuration: the sheets, which have a total length $L_{total}$, are divided in the flow direction FD into two or more different sections 13, 14 that are provided alternately with catalytic coatings 11, 12 or do not have any catalytic coatings at all. Within a section (section 13 in the plane sheet S1 or section 14 in the plane sheet S2 in FIG. 2) provided with catalytic coatings, the sheet is coated transversely to the flow direction FD across the width w, coated alternately in each case on the top (catalytic coating 11) and on the bottom (catalytic coating 12), so that the plane sheets S1, . . . ,S4 are not provided at any point with a catalytic coating on both sides at the same time. In adjoining plane sheets (e.g., S1 and S2), the sections provided with catalytic coatings 11, 12 are offset to each other in such a way (FIGS. 2, 3) that the coatings are alternated. At first, the sheet S1 is coated in section 13 across the length $L_{coated}$, while the sheet S2 is uncoated in this section. In the next section 14, the sheet S1 is then uncoated, while the sheet S2 is coated. Each section therefore has specific channels (marked in FIG. 1 and FIG. 5 with an "*") which do not have any catalytic coating 11, 12 in this section.

Figure 3:
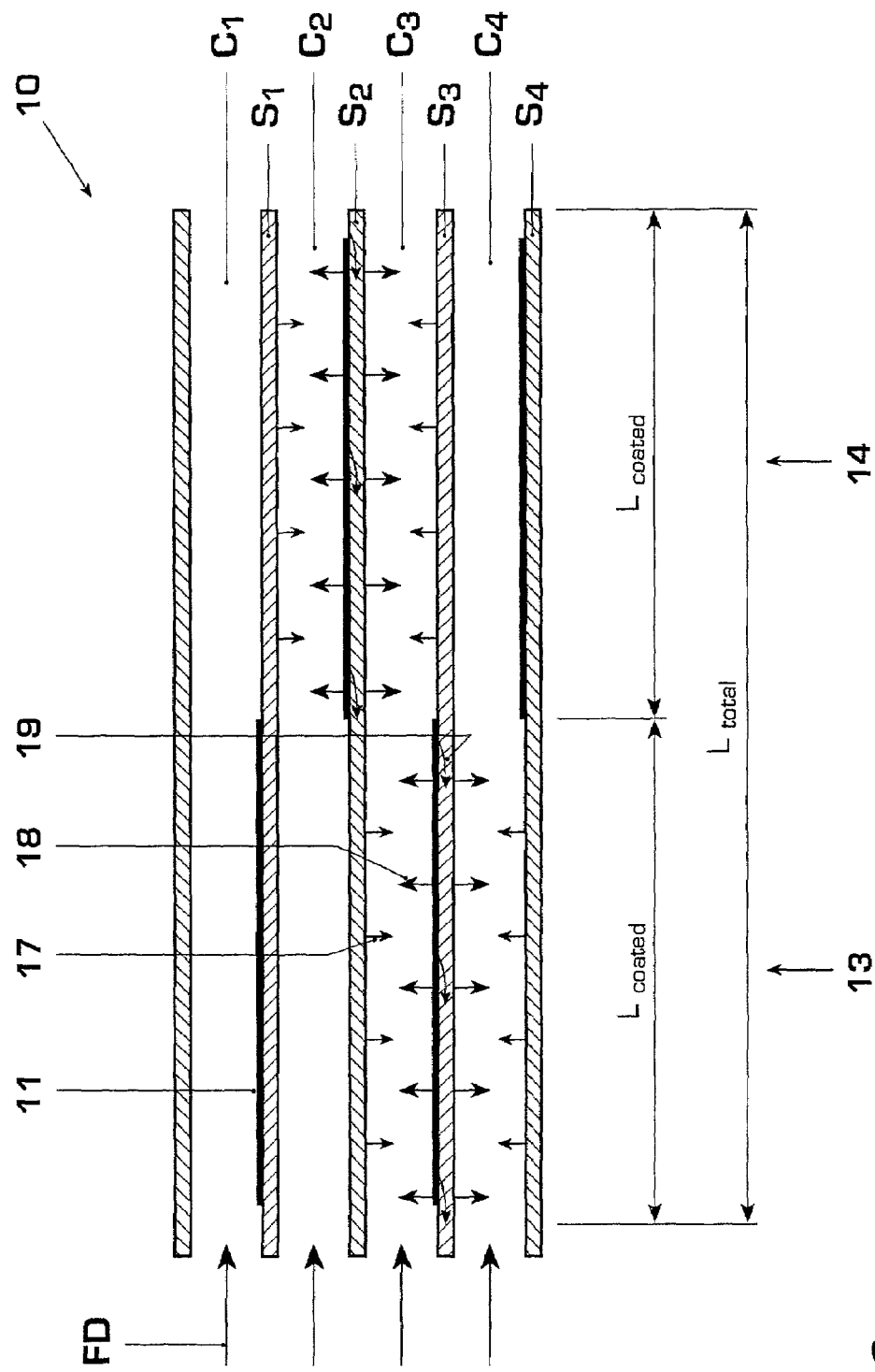
FIG. 3 shows the longitudinal section through the catalyzer from FIG. 1 along plane III—III.

FIGS. 1 and 3 show how the sheets CS2, S2, and CS3 are arranged on the first length $L_{coated}$ (the first section 13) so that they form channels with a relatively large surface, whose uncoated walls absorb the heat radiated from the catalytically active coatings 11, 12 on sheets S1 and S3 and remove it by convection in the respective channel. FIG. 3 clearly distinguishes between the coated and uncoated channels in one section (13). In the following section (14), the sheets CS1, S1, CS2, and CS3, S3, CS4 form the uncoated channels, while the sheet S2 is catalytically active and radiates heat. It is advantageous if the catalyzer 10 has more than two sections 13, 14 with alternating coating, since this improves the uniformity of the temperature and fuel concentration within the catalyst 10. In the interest of this uniformity and also a good mixing of the discharged gases, there should always be an even number of sections 13, 14 or $L_{total}=2nL_{coated}$ with n=1,2,3, . . . should apply.

The various types of heat transport occurring with the exemplary embodiment can be explained with FIG. 3: Of the uncoated surfaces of sheets S1, . . . ,S4, heat that has been emitted by a catalytic coating and absorbed is transferred by a convective heat transport 17 (thin, straight arrows in FIG. 3) to the flow in the channel. Of the sections of sheets S1, . . . ,S4 provided with a catalytic coating, heat is transferred via a combined convective and radiating heat transport 18 (thick, straight arrows in FIG. 3) into the atmosphere. And finally, another heat transport 19 takes place via solid-state conduction inside sheets S1, . . . ,S4 (thin, curved arrows in FIG. 3).

FIG. 3 shows clearly that the plane sheets S1, . . . ,S4 each are uncoated at the inlet and at the outlet of the catalyzer. It is preferred that this uncoated surface has a depth of approximately 2–5 mm at the inlet and a depth of approximately 10–15 mm at the outlet. On the one hand, this achieves a better mechanical strength in these areas, and on the other hand, allows for a better manufacturing of the catalyzer because the plane sheets S1, . . . ,S4 can be welded better to the corrugated sheets CS1, . . . ,CS4. At the outlet, the uncoated area also functions as radiation protection against a homogeneous flame or a hot flame outside of the catalyzer.

The basic advantages of the configurations shown in FIGS. 1–3 are the two following:

The surface absorbing the heat radiation is maximized so that the surface of the catalytic coatings 11, 12 is cooled to an acceptable level.

All channels are provided in at least one of the sections with a catalytic coating, so that a uniform reduction of the fuel content towards the outlet of the catalyzer is ensured, preventing a homogeneous ignition within the catalyzer.

However, there are additional advantages through the shown catalyzer structure: Firstly, the hot gases exiting from the catalyzer are significantly more homogeneous (i.e. with the same degree of conversion in all channels) than with conventional catalyzer configurations. Since such a catalytic reactor is used in gas turbines where one part of the fuel is burned homogeneously, this enables a combustion that is easier to control and is cleaner, i.e. with lower NOx and CO concentrations, downstream from the catalyzer. On the other hand, the sheets S1, . . . ,S4 provided with the catalytic coating 11, 12 are relatively thick—as already mentioned above—so that the heat can be passed further upstream in order to improve (a) the cooling in the area of the coating and (b) the "light-off" in the upstream areas.

Another point is related to pressure losses: In previous technical solutions, contorted channels that result in higher pressure losses and are more susceptible to structural deformations during operation (i.e. the channels bend and in this way noticeably change the effect of the catalyzer) were proposed. In contrast, if—as in the present solution—straight channels are used, not only are the pressure losses that play a critical role in the efficiency of gas turbines reduced, but the production and assembly processes are also significantly simplified. Finally, the surfaces of the channels not provided with catalytic coatings can be provided with a special coating that improves the absorption of the radiated heat. This coating also could promote, for example, recombination reactions of radicals (OH, H, O) in the gas phase in order to inhibit a homogeneous ignition.

Figure 4:
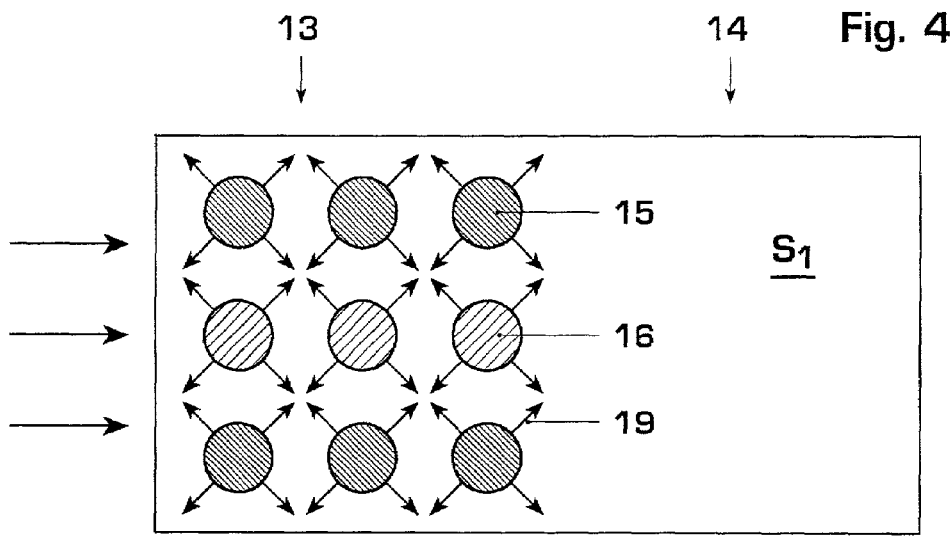
FIG. 4 shows an alternative type of coating (with respect to FIG. 2) of the sheets of a catalyzer according to the invention.
Figure 4:
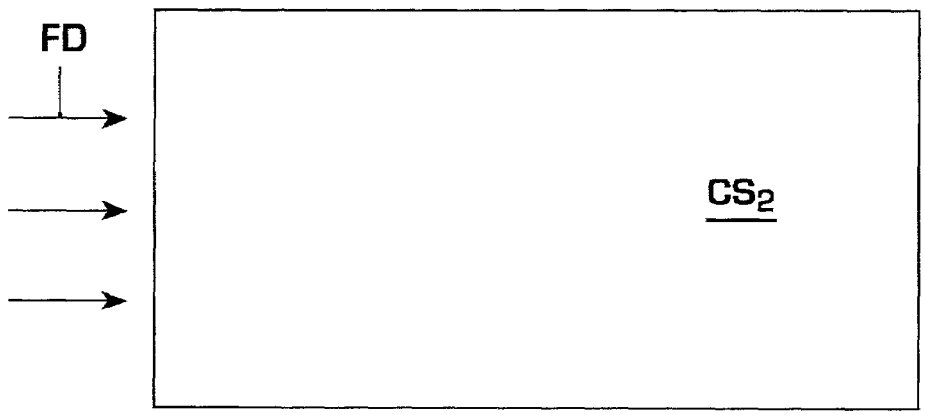
Figure 4:
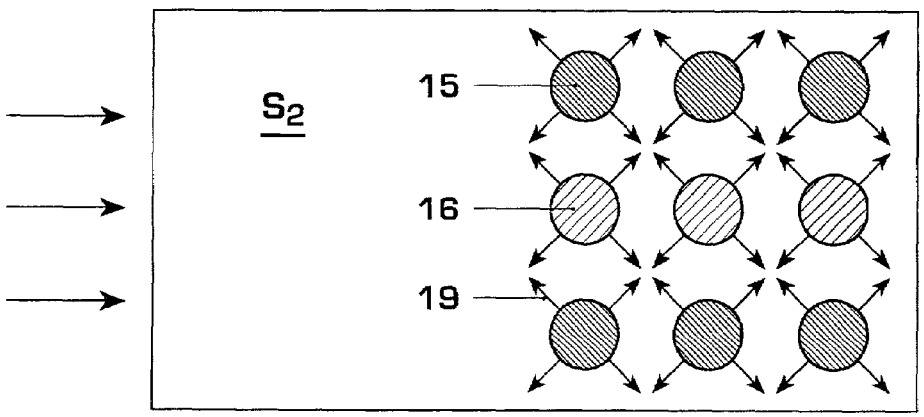
Figure 5:
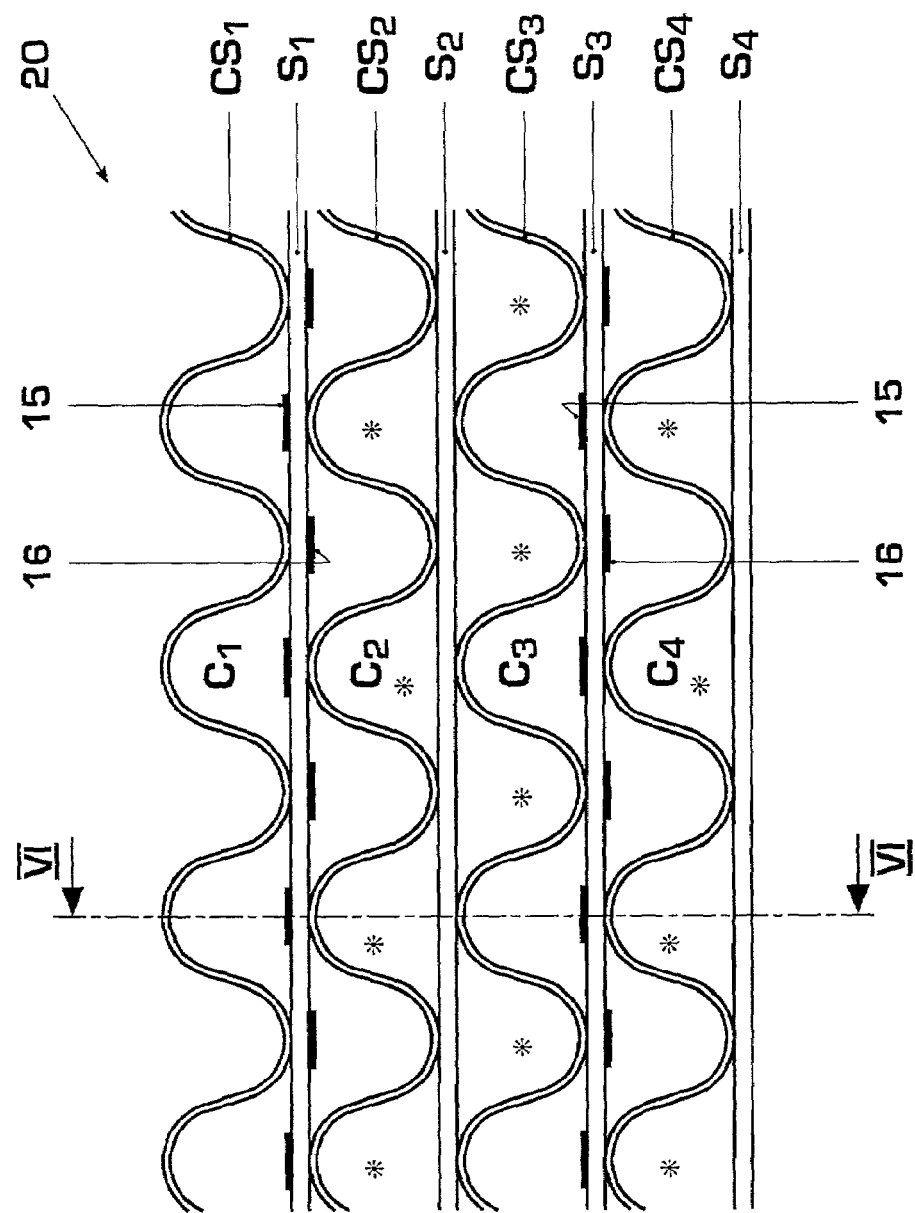
FIG. 5 shows a view comparable to FIG. 1 of a catalyzer according to a second preferred exemplary embodiment of the invention with a coating according to FIG. 4.
Figure 6:
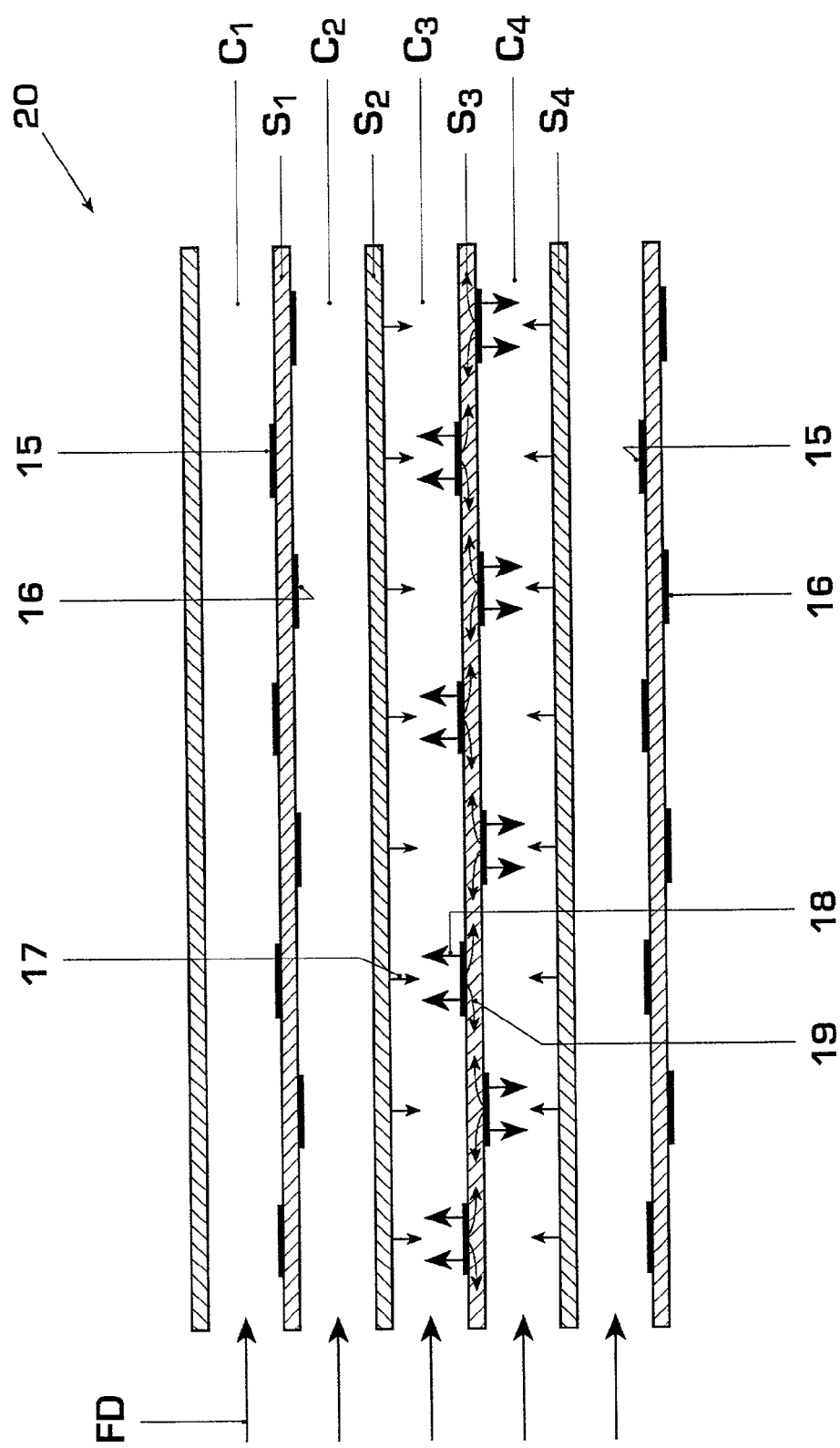
FIG. 6 shows the longitudinal section through the catalyzer from FIG. 5 along plane VI—VI.

In a modification of the exemplary embodiment shown in FIGS. 1 to 3, the cooling of the coated surfaces can be improved with an expansion of the conductive heat transport (19 in FIG. 3). According to FIG. 4, this is achieved by providing islet-like catalytic coatings 15, 16, instead of the continuous bands with catalytic coating (FIG. 2). Essentially, heat is transported here by way of a conductive heat transport 19 from the hot islets of the catalytic coating 15, 16 into the relatively cool regions between the islets and removed from there by a convective heat transport to the flowing medium. A frontal view of the structure of the resulting catalyzer 20 comparable to FIG. 1 is shown in FIG. 5. FIG. 6 shows the longitudinal section through the catalyzer 20 along plane VI—VI in FIG. 5. This also realizes a combination of a purely convective heat transport 17, a mixed convective and radiating heat transport 18, and a conductive heat transport 19.

In comparison to the channel diameter, the islets with the catalytic coating 15, 16 can be made relatively small, resulting in the following advantages:

An even higher uniformity in all channels.

An even better removal of the heat from the catalytically coated islets, since the lengths for the heat conduction are reduced (the heat conduction is reversely proportional to the diameter of the islets).

Figure 10:
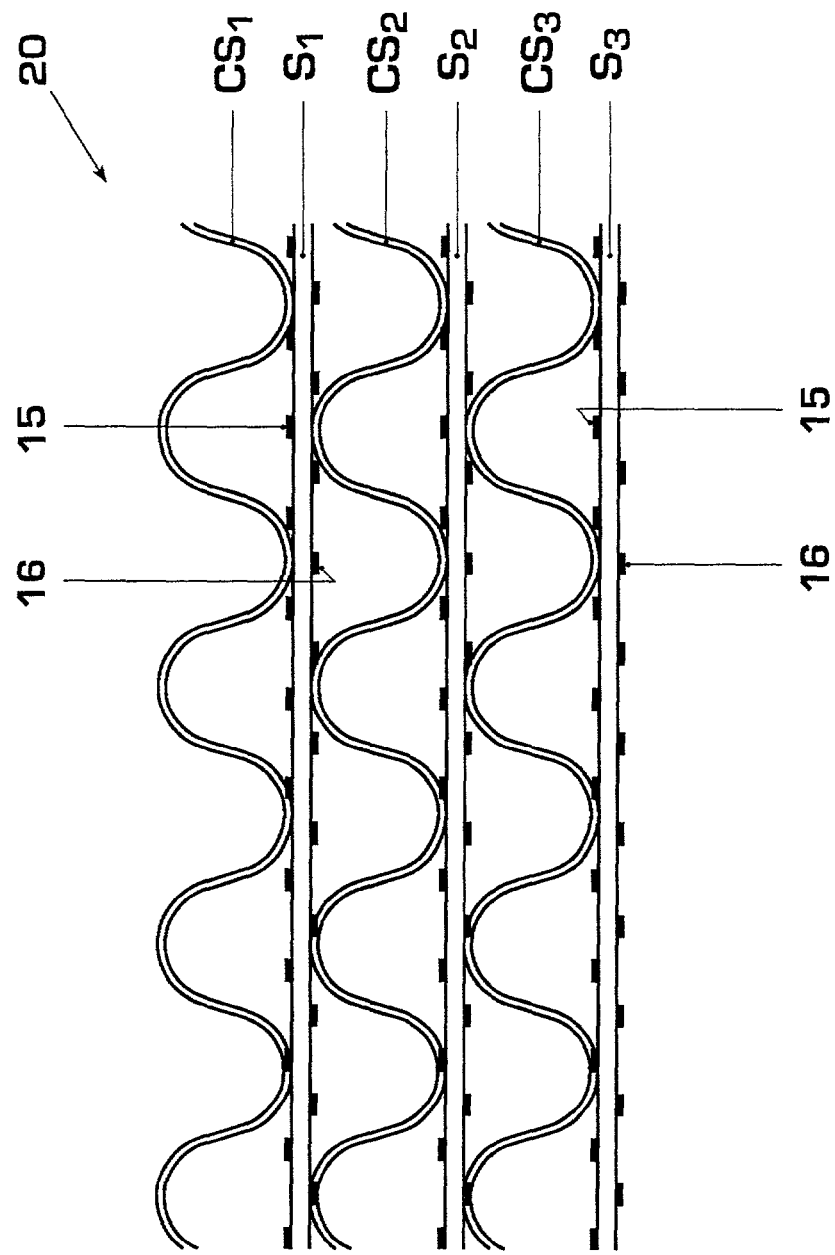
FIG. 10 shows the frontal view, comparable to FIG. 1 and 5, of a catalyzer with a coating according to FIG. 7.

The small dimensions of the catalytically coated islets 15, 16 make it possible to accommodate more than one row (in flow direction). An example of such a configuration is shown in FIG. 10 in a view comparable to FIG. 5. But it would also be possible to arrange the catalytically coated islets 15, 16 uniformly alternating on sheets S1, . . . ,S4 in the manner shown in FIG. 7.

In order to increase the throughput, it is advantageous that sections of the corrugated sheets CS1, . . . ,CS4 also are coated in the same manner as the plane sheets S1, . . . ,S4, whereby here also, for reasons of heat removal, both sides of the corrugated sheets are not provided with a coated surface at the same time. Compared to the exemplary embodiments shown in FIGS. 1 to 7, in which the corrugated sheets CS1, . . . ,CS4 are uncoated, this has a somewhat negative effect on the temperature. The coating of sections of the corrugated and plane sheets again should take place in such a way that inside the channels C1, . . . ,C4 sections with the catalytic coatings 11, 12, 15, 16 each again have uncoated sections positioned opposite from them.

Figure 11:
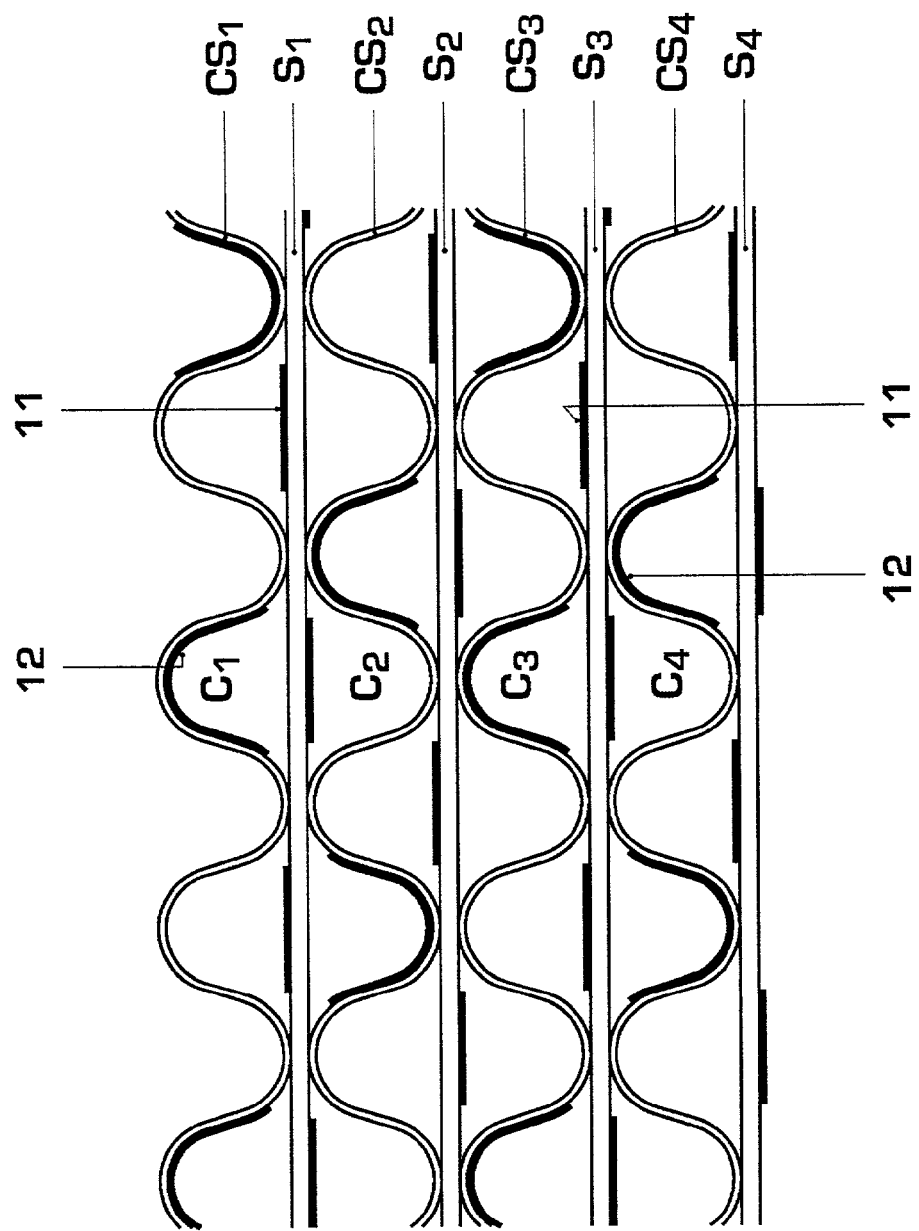
FIG. 11 shows another embodiment of the invention, in which sections of the corrugated sheets between the plane sheets are coated.

FIG. 11 shows a schematic portrayal of the view in the flow direction onto the inlet side of a catalyzer in such a further exemplary embodiment. In comparison to the first exemplary embodiment shown in FIG. 1, in which uncoated, corrugated sheets CS1, . . . ,CS4 were used, FIG. 11 clearly shows that the catalytic coating surface within the channels C1, . . . ,C4 is distinctly enlarged by using corrugated sheets with coated sections (degree of coating of significantly more than 25%), and the catalyzer throughput therefore can be increased advantageously. Further, in this example, both the plane sheets S1, . . . ,S4 as well as the corrugated sheets CS1, . . . ,CS4 are not provided at any point of the sheets with a catalytically coating both on their top and bottom side at the same time, so that the heat removal is ensured during operation. FIG. 11 also shows that in contrast to the exemplary embodiment shown in FIG. 1, plane and corrugated sheets S1, . . . ,S4, CS1, . . . ,CS4 with an approximately identical thickness can be used.

Figure 8:
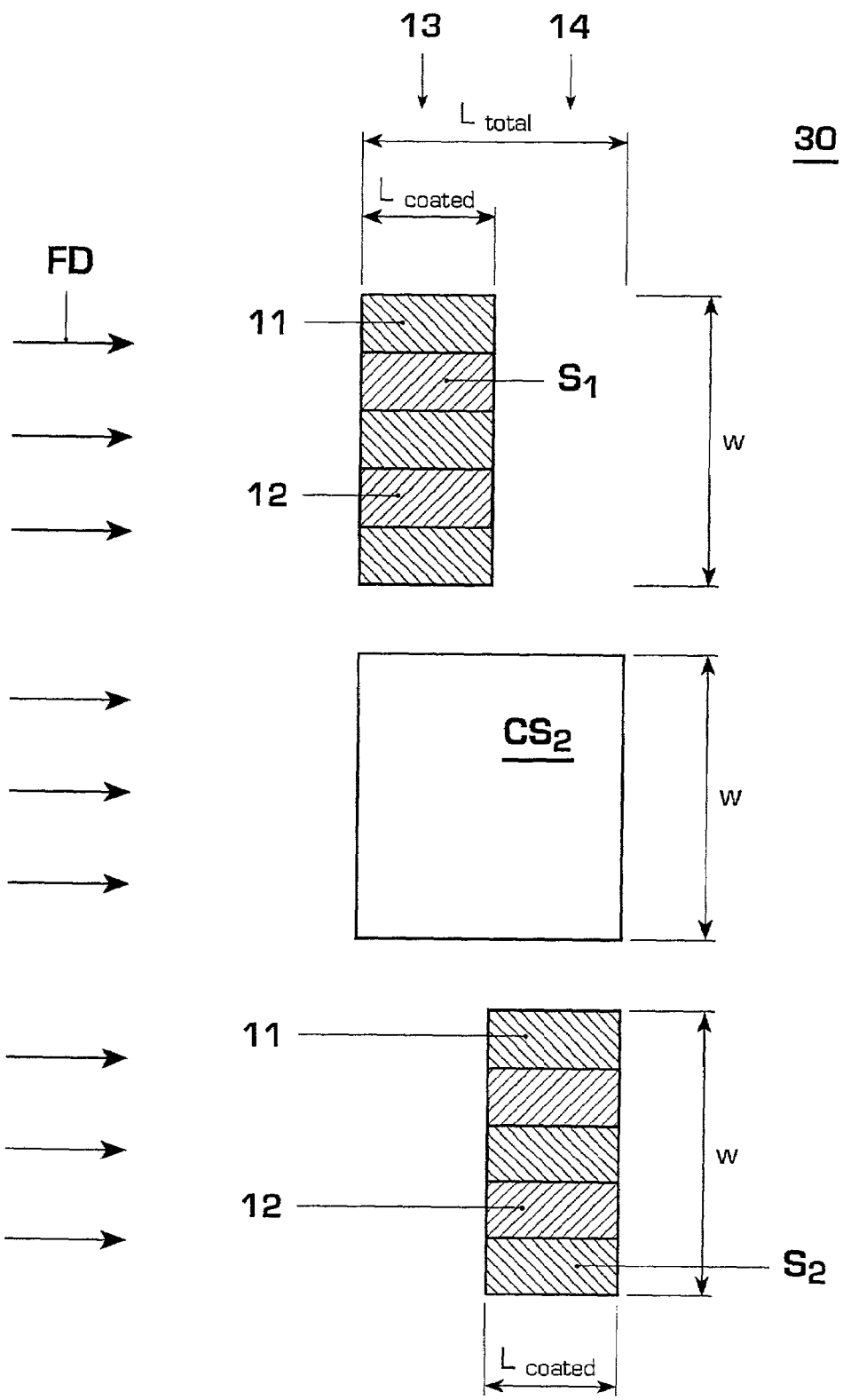
FIG. 8 shows a view comparable to FIG. 2 with various coated and uncoated sheets of the catalyst according to another preferred exemplary embodiment of the invention.
Figure 9:
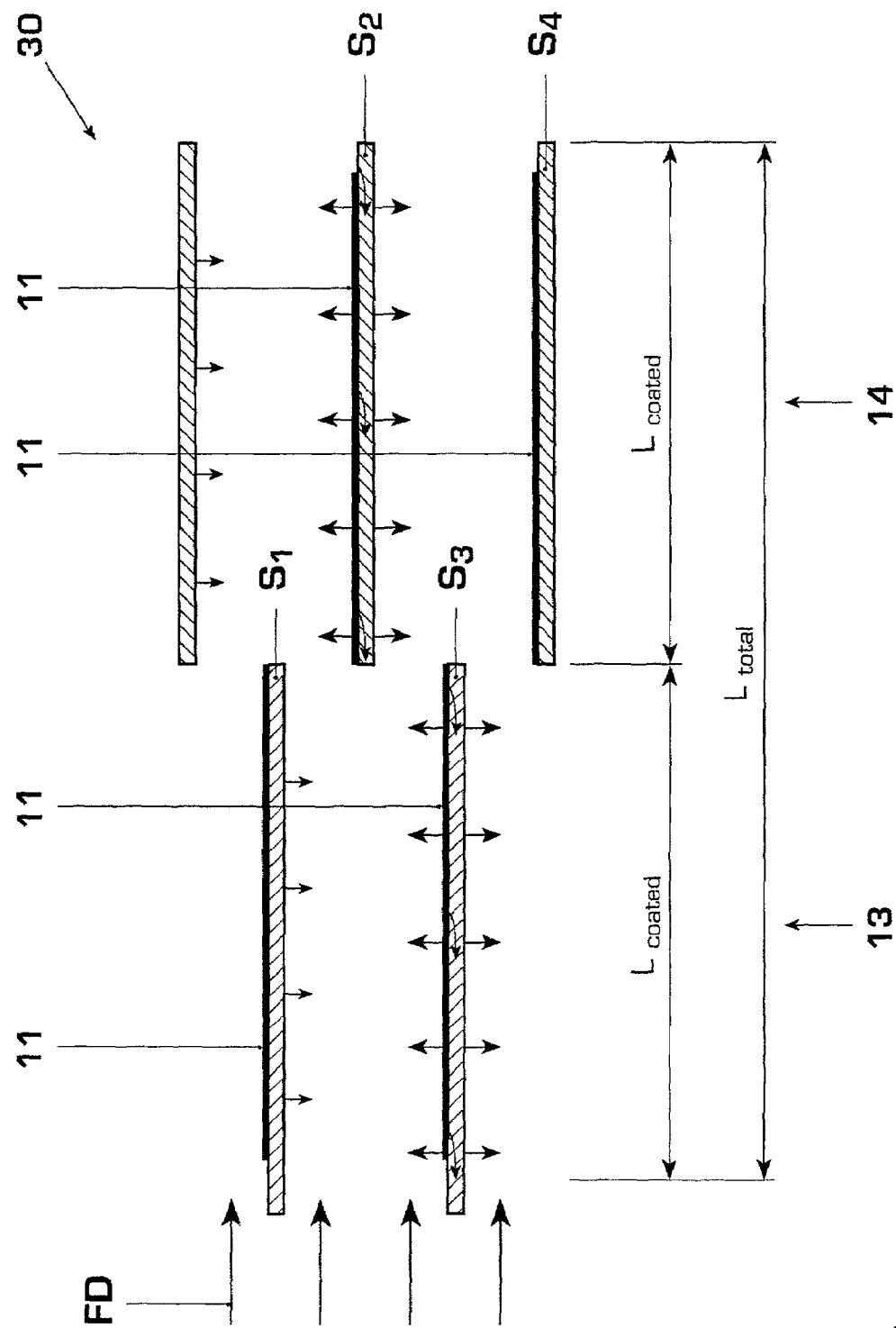
FIG. 9 shows the longitudinal section through a catalyst with a coating according to FIG. 8.

A further modification of the exemplary embodiment shown in FIGS. 1 to 3, and in FIG. 11, in which all types of catalytic coatings explained so far are used, is shown in FIGS. 8 and 9. The catalyzer 30 shown there uses plane sheets S1, . . . ,S4, the length of which is no longer $L_{total}$ but rather only $L_{coated}$. The sheets are provided on this reduced length completely, according to one of the types described previously, with catalytic coatings 11, 12 (or 15, 16). The view from the front onto the catalyzer 30 is similar to the one in FIG. 1. The longitudinal section in FIG. 9, however, shows the differences of the configuration with the short channel sections that transition into each other. The advantages of such a modification are double:

It enables a mixing between the channels, which further improves the uniformity of temperature and fuel concentration.

The formation of (laminar) marginal layers along the catalytically coated surfaces is interrupted repeatedly, so that the reaction process is removed from an area with diffusion-controlled reaction, and in this way the surface temperatures are reduced. The length $L_{coated}$ hereby must be in the same magnitude as the lengths over which the marginal layers develop.

Figure 7:
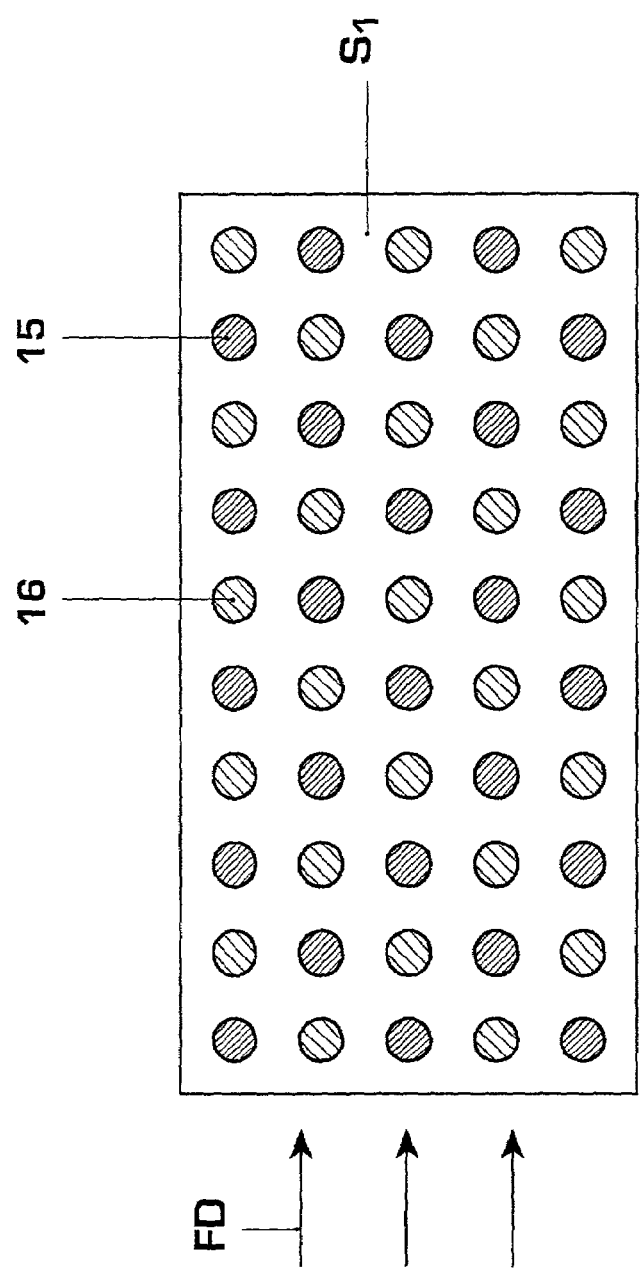
FIG. 7 shows another possibility of the coating within the framework of the invention.

Another configuration is characterized in that all plane sheets S1, . . . ,S4 are continuously coated in the same manner as shown in FIG. 7. Instead of the alternating coating on adjoining sheets, the structure shown in FIG. 10 is obtained. Since in this case the uncoated areas of the channels are significantly reduced in comparison to the variations described further above, cooling by heat radiation is reduced, and the main emphasis is on cooling by heat conduction and convective heat transport.

Figure 12:
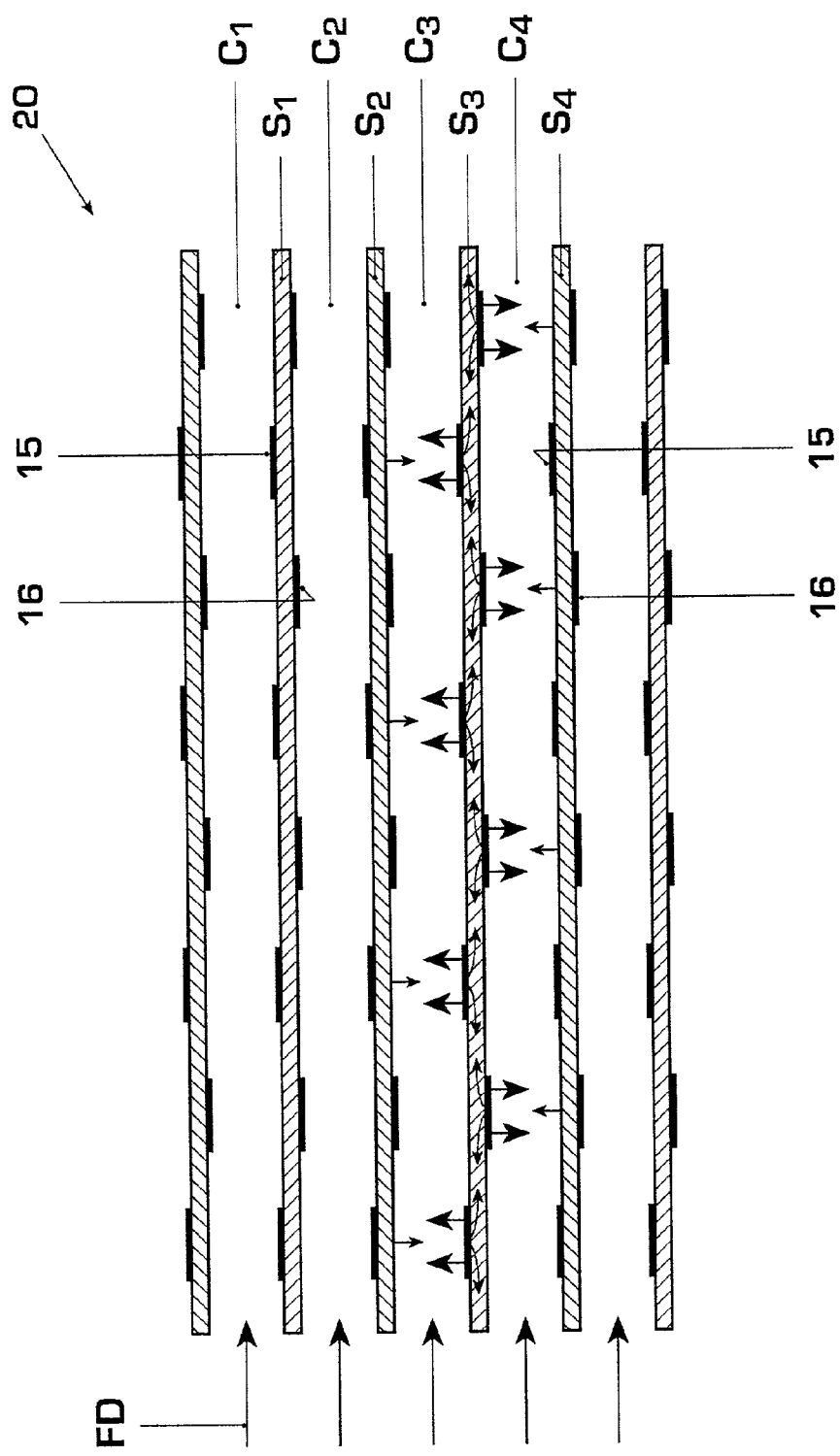
FIG. 12 shows a longitudinal section through the catalyzer analog to FIG. 6, for a further embodiment in which sections of all plane sheets have been coated.

FIG. 12 shows another embodiment analogously to FIG. 6. In comparison to the embodiment according to FIG. 6, a larger coating surface exists here since every plane sheet S1, . . . ,S4 is coated, not just every second one.

Overall, the invention results in a catalyzer that is characterized by the following properties and advantages:

The surface temperature of the catalytically coated areas is maintained under the temperature that would result in deactivation.

The risk of homogeneous ignition in the catalyzer is minimized.

Heat is conducted into the (thicker) carrier plates for the coating; this improves the "light-off," and, because of thermal inertia, the stability of the system is also improved.

Pressure losses are reduced, and the production is improved or simplified.

The hot gases exiting the catalyzer are mixed more uniformly, resulting in a more controllable, homogeneous combustion and a cleaner combustion with lower NOx and CO concentrations.

Naturally, the invention is not limited to the exemplary embodiments described. It would be possible, for example, in order to form channels C1, . . . ,C4, to use coated, corrugated sheets CS1, . . . ,CS4 in all described exemplary embodiments instead of the uncoated, corrugated sheets CS1, . . . ,CS4.

What is claimed is:

1. A catalyzer, comprising:
a plurality of plane sheets arranged superposed and spaced apart from each other in a stack, each of the plane sheets having a top side and a bottom side, each two successive plane sheets defining a channel that extends parallel to a flow direction, said channel being delimited by the plane sheets;
a corrugated sheet uncoated with a catalytic coating and having a plurality of ridges and grooves disposed within the channel, the ridges being connected to the plane sheets of the channel and the grooves being substantially parallel to the flow direction; and a catalytic coating disposed on a predetermined section of at least one of the top side and the bottom side of each plane sheet and defining a coated section which only partially covers the top side and/or the bottom side, the coated section positioned opposite to an uncoated section of the plane sheet, wherein at least a portion of a heat radiation emitted from the catalytic coating is absorbed by the uncoated section of the plane sheet.

2. The catalyzer as claimed in claim 1, wherein the uncoated section of the plane sheet is provided with a material for absorbing at least a portion of the heat radiated from the catalytic coating or for promoting a recombination reaction of at least one radical.

3. The catalyzer as claimed in claim 1, wherein the corrugated sheet is provided with a material for absorbing at least a portion of the heat radiated from the catalytic coating or for promoting a recombination reaction of at least one radical.

4. The catalyzer as claimed in claim 1, wherein the corrugated sheet has a thickness less than a thickness of the plane sheet.

5. The catalyzer as claimed in claim 1, wherein a thickness of the plane sheet and a thickness of the corrugated sheet is approximately equal.

6. The catalyzer as claimed in claim 1, wherein the corrugated sheet has a thickness of less than 0.1 mm.

7. The catalyzer as claimed in claim 6, wherein the thickness is about 0.05 mm.

8. The catalyzer as claimed in claim 1, wherein each plane sheet is uncoated at an inlet and at an outlet of the catalyzer.

9. The catalyzer as claimed in claim 8, wherein the uncoated surface of the plane sheet has a length in the flow direction of approximately 2 to 5 mm at the inlet and a length in the flow direction of approximately 10 to 15 mm at the outlet.

10. The catalyzer as claimed in claim 1, wherein a cross-section of each channel is essentially the same.

11. The catalyzer as claimed in claim 1, wherein the catalyzer is used for an exothermic reaction having a concomitant, homogeneous gas phase reaction.

12. The catalyzer as claimed in claim 11, wherein the catalyzer is used in a gas turbine.

13. A catalyzer, comprising:
a plurality of plane sheets arranged superposed and spaced apart from each other in a stack, each two successive plane sheets defining a channel that extends parallel to a flow direction, the channel being delimited by the plane sheets; and
a catalytic coating disposed on a predetermined section of each plane sheet and defining a coated section, the coated section positioned opposite to an uncoated section of the plane sheet;
at least a portion of a heat radiation emitted from the catalytic coating is absorbed by the uncoated section of the plane sheet;
each plane sheet has a total length in the flow direction, the total length divided into an even number of coated sections, each coated section of a coated length; and
wherein each plane sheet has a sequence of alternating coated and uncoated sections, the coated and uncoated sections on the two successive plane sheets defining the channel are offset from each other in the flow direction by one coated length.

14. The catalyzer as claimed in claim 13, wherein the catalytic coating is disposed as a parallel, continuous band of approximately constant width that extends in the flow direction, the band arranged across a width of the plane sheet alternately on a top side and a bottom side of the plane sheet and a cross section of the plane sheet perpendicular to the flow direction has the band on only one side.

15. The catalyzer as claimed in claim 14, wherein the band of the catalytic coating is associated with each of the channels.

16. The catalyzer as claimed in claim 13, wherein the catalytic coating is a row that extends in the flow direction having a plurality of equally sized, parallel, individual islet-shaped areas, the row arranged across a width of the plane sheet alternately on a top side and a bottom side of the plane sheet and a cross section of the plane sheet perpendicular to the flow direction has the row on only one side.

17. The catalyzer as claimed in claim 16, wherein the row of the islet-shaped catalytic coating is assigned to each of the channels.

18. The catalyzer as claimed in claim 1, wherein the catalyzer has a total length in the flow direction, the total length divided into an even number of coated sections, each coated section of a coated length, and
wherein each plane sheet extends only over one of the coated sections and is provided with a catalytic coating and successive plane sheets in the stack are staggered relative to the coated sections.

19. The catalyzer as claimed in claim 18, wherein the coated section is a parallel, continuous band of approximately constant width that extends in the flow direction, the band arranged across the width of the plane sheet alternately on a top side and a bottom side of the plane sheet and a cross section of the plane sheet perpendicular to the flow direction has the band on only one side.

20. The catalyzer as claimed in claim 19, wherein the band is associated with each of the channels.

21. The catalyzer as claimed in claim 18, wherein the coated section is a row that extends in the flow direction having a plurality of equally sized, parallel, individual islet-shaped areas, the row arranged across a width of the plane sheet and alternately on top side and the bottom side of the plane sheet and a cross section of the plane sheet perpendicular to the flow direction has the row on only one side.

22. The catalyzer as claimed in claim 21, wherein the row is associated with each of the channels.

23. The catalyzer as claimed in claim 1, wherein the coated section is provided over a total length of each plane sheet, the coated section having a plurality of rows, each row extending in the flow direction and having a plurality of equally sized, parallel, individual islet-shaped areas, and
wherein the areas are arranged both within each row and transversely to each row alternately on the top side and bottom side of the plane sheet and a cross section of the plane sheet perpendicular to the flow direction has the coating on only one side.

24. The catalyzer as claimed in claim 23, wherein at least one row is associated with each of the channels.

25. The catalyzer of claim 1, wherein each of the coated sections of each plane sheet is disposed within a groove of the corrugated sheet.

26. The catalyzer of claim 25, wherein each of the successive corrugated sheets in the stack are staggered relative to the coated sections.

27. The catalyzer as claimed in claim 25, wherein the coated section is a parallel, continuous band of approximately constant width that extends in the flow direction, the band arranged within the groove of the corrugated sheet alternately on a top side and a bottom side of the corrugated sheet and a cross section of the corrugated sheet perpendicular to the flow direction has the band on only one side.

28. The catalyzer as claimed in claim 25, wherein the coated section is a row that extends in the flow direction having a plurality of equally sized, parallel, individual islet-shaped areas, the row arranged within the groove of the corrugated sheet alternately on a top side and a bottom side of the corrugated sheet and a cross section of the corrugated sheet perpendicular to the flow direction has the row on only one side.

29. The catalyzer as claimed in claim 28, wherein each row has a plurality of equally sized, parallel, individual islet-shaped areas, and
   wherein the areas are arranged both within each row and transversely to each row alternately on the top side and bottom side of the corrugated sheet and a cross section of the corrugated sheet perpendicular to the flow direction has the coating on only one side.

30. A catalyzer, comprising:
   a plurality of plane sheets arranged superposed and spaced apart from each other in a stack, each of the plane sheets having a top side and a bottom side, each two successive plane sheets defining a channel that extends parallel to a flow direction, the channel being delimited by the plane sheets;
   a corrugated sheet having a plurality of ridges and grooves disposed within the channel, the ridges being connected to the plane sheets of the channel and the grooves being substantially parallel to the flow direction;
   a catalytic coating disposed on a predetermined section of at least one of the top side and the bottom side of each plane sheet and defining a coated section which only partially covers the top side and/or the bottom side, the coated section positioned opposite to an uncoated section of the plane sheet; and
   a catalytic coating disposed on at least a portion of the corrugated sheet, the portion defining a coated section of the corrugated sheet;
   wherein at least a portion of a heat radiation emitted from the catalytic coating is absorbed by the uncoated section of the plane sheet.

* * * * *